(12) United States Patent
Miyake

(10) Patent No.: US 10,898,963 B2
(45) Date of Patent: Jan. 26, 2021

(54) BRAZING SHEET FOR FLUX-FREE BRAZING, METHOD FOR FLUX-FREE BRAZING AND METHOD FOR PRODUCING HEAT EXCHANGER

(71) Applicant: MITSUBISHI ALUMINUM CO., LTD., Tokyo (JP)

(72) Inventor: Hideyuki Miyake, Shizuoka (JP)

(73) Assignee: MITSUBISHI ALUMINUM CO., LTD., Tokyo (JP)

(*) Notice: Subject to any disclaimer, the term of this patent is extended or adjusted under 35 U.S.C. 154(b) by 0 days.

(21) Appl. No.: 16/312,894

(22) PCT Filed: Jun. 5, 2017

(86) PCT No.: PCT/JP2017/020770
§ 371 (c)(1),
(2) Date: Dec. 21, 2018

(87) PCT Pub. No.: WO2017/221674
PCT Pub. Date: Dec. 28, 2017

(65) Prior Publication Data
US 2019/0337074 A1    Nov. 7, 2019

(30) Foreign Application Priority Data

Jun. 23, 2016  (JP) .................................. 2016-124321
Jul. 14, 2016  (JP) .................................. 2016-139191

(51) Int. Cl.
*B23K 1/19* (2006.01)
*B23K 35/02* (2006.01)
(Continued)

(52) U.S. Cl.
CPC ................ *B23K 1/19* (2013.01); *B23K 1/008* (2013.01); *B23K 1/0012* (2013.01);
(Continued)

(58) Field of Classification Search
None
See application file for complete search history.

(56) References Cited

U.S. PATENT DOCUMENTS 3,843,333 A * 10/1974  Woods ................ B23K 35/002
                                                         428/654
5,234,759 A    8/1993  Inabayashi et al.
(Continued)

FOREIGN PATENT DOCUMENTS

CN    102089117 A    6/2011
EP    0597091 A1     5/1994
(Continued)

OTHER PUBLICATIONS

International Search Report (ISR) dated Aug. 29, 2017 issued in International Application No. PCT/JP2017/020770.
(Continued)

*Primary Examiner* — Devang R Patel
(74) *Attorney, Agent, or Firm* — Holtz, Holtz & Volek PC

(57) ABSTRACT

Brazing sheet for flux-free brazing, wherein an outermost surface brazing filler metal layer, consisting of an Al—Si-based alloy containing 4 to 12% Si in mass %, and an intermediate brazing filler metal layer, consisting of an Al—Si—Mg-based alloy containing 1% or more and less than 4% Si and 0.1 to 5.0% Mg in mass %, are cladded on one side or both sides of a core material, and wherein aluminum members are joined to each other without using flux in a non-oxidizing gas atmosphere under normal pressure with an oxygen concentration of 300 ppm or less, using the brazing sheets.

9 Claims, 3 Drawing Sheets

(51) Int. Cl.
- *B32B 15/20* (2006.01)
- *C22C 21/02* (2006.01)
- *B23K 1/00* (2006.01)
- *B23K 1/008* (2006.01)
- *B23K 35/28* (2006.01)
- *B32B 15/01* (2006.01)
- *C22C 21/08* (2006.01)
- *B23K 103/10* (2006.01)
- *B23K 101/14* (2006.01)

(52) U.S. Cl.
CPC ........ *B23K 35/0238* (2013.01); *B23K 35/286* (2013.01); *B32B 15/016* (2013.01); *B32B 15/20* (2013.01); *C22C 21/02* (2013.01); *C22C 21/08* (2013.01); *B23K 2101/14* (2018.08); *B23K 2103/10* (2018.08)

(56) References Cited

U.S. PATENT DOCUMENTS

| | | | | |
|---|---|---|---|---|
| 6,129,143 | A * | 10/2000 | Hasegawa | B23K 35/286 165/133 |
| 6,316,126 | B1 * | 11/2001 | Hasegawa | B32B 15/016 138/140 |
| 6,555,251 | B2 * | 4/2003 | Kilmer | B23K 35/0238 428/654 |
| 7,514,155 | B2 * | 4/2009 | Benedictus | B23K 35/0238 148/523 |
| 7,749,613 | B2 * | 7/2010 | Koshigoe | C22C 21/14 428/654 |
| 8,455,110 | B2 | 6/2013 | Wittebrood et al. | |
| 2003/0051342 | A1 | 3/2003 | Hasegawa et al. | |
| 2004/0035911 | A1 * | 2/2004 | Dockus | F28F 21/084 228/56.3 |
| 2004/0238605 | A1 | 12/2004 | Nishimura et al. | |
| 2008/0003451 | A1 * | 1/2008 | Suzuki | B23K 35/0266 428/654 |
| 2009/0162686 | A1 * | 6/2009 | Matsukado | B32B 15/016 428/576 |
| 2012/0177947 | A1 * | 7/2012 | Abrahamsson | B23K 35/002 428/654 |
| 2014/0246483 | A1 * | 9/2014 | Wittebrood | B21C 23/002 228/249 |
| 2015/0165564 | A1 | 6/2015 | Anl et al. | |
| 2016/0161199 | A1 * | 6/2016 | Ando | C22C 21/10 165/133 |
| 2016/0319399 | A1 * | 11/2016 | Ando | B23K 1/00 |
| 2018/0111232 | A1 * | 4/2018 | Shibuya | C22C 21/12 |

FOREIGN PATENT DOCUMENTS

| | | | | |
|---|---|---|---|---|
| EP | 1306207 | A1 * | 5/2003 | ............ F28F 21/089 |
| GB | 2378148 | A | 2/2003 | |
| JP | 4547032 | B1 | 9/2010 | |
| JP | 2013086103 | A | 5/2013 | |
| JP | 2014037576 | A | 2/2014 | |
| JP | 2014155955 | A | 8/2014 | |
| WO | 03028946 | A1 | 4/2003 | |
| WO | 2005014274 | A1 | 2/2005 | |
| WO | 2013180630 | A1 | 12/2013 | |
| WO | WO-2015104761 | A1 * | 7/2015 | |

OTHER PUBLICATIONS

Written Opinion dated Aug. 29, 2017 issued in International Application No. PCT/JP2017/020770.
English Language Translation of International Preliminary Report on Patentability (IPRP) and Written Opinion dated Jan. 3, 2019 issued in International Application No. PCT/JP2017/020770.
Extended European Search Report (EESR) dated May 27, 2019 issued in European Application No. 17815143.7.
Aluminum Association, "International Alloy Designation and Chemical Composition Limits for Wrought Aluminum and Wrought Aluminum Alloys", Jan. 31, 2015; XP055494916; <http://www.aluminum.org/sites/default/files/TEAL_1_OL_2015.pdf>.
Takemoto, et al., "Effect of Bismuth Addition to Brazing Sheet Claddings on Fluxless Brazability of Aluminum", Transaction of JWRI, vol. 12, No. 2, Dec. 31, 1983, pp. 33-41, XP055334234.

* cited by examiner (a) Brazing evaluation model (b) Position of evaluation of the joining part width

BRAZING SHEET FOR FLUX-FREE BRAZING, METHOD FOR FLUX-FREE BRAZING AND METHOD FOR PRODUCING HEAT EXCHANGER

TECHNICAL FIELD

This invention relates to a brazing sheet for flux-free brazing used for brazing aluminum alloy members flux-free, a method for flux-free brazing and a method for producing a heat exchanger.

BACKGROUND ART

In the field of brazing, including automobile heat exchangers, the flux-free method using Al—Si—Mg alloy brazing filler metal is proposed. With flux-free brazing using Al—Si—Mg alloy brazing filler metals, the Mg in the melt-activated brazing filler metal reduces and decomposes the Al oxide film ($Al_2O_3$) on the joining part surface, making joining possible. With occlusive face joining joints, due to the decomposition of the oxide film by Mg, a good joining state is obtained with a joint as a combination of brazing sheets having a brazing filler metal, or with a joint as a combination of joining members without a brazing sheet or brazing filler metal (bare materials).

However, with a joint shape having an open part that is easily affected by the atmosphere, the MgO film grows more easily on the surface of the Mg-added brazing filler metal, but the MgO film being a stable oxide film hard to decompose, the joining is significantly inhibited. For this reason, a method for flux-free brazing, wherein a stable joining state is obtained by a joint having an open part, is strongly desired.

Regarding the above problem, a technique is proposed wherein the joining state is improved by making the outermost surface layer a Mg-free alloy to suppress the growth of the MgO film on the brazing filler metal surface, and by applying the brazing filler metal with Mg on the intermediate layer (see Patent Literature 1).

CITATION LIST

Patent Literature

[Patent Literature 1] Japanese Patent Laid-Open No. 2014-155955

SUMMARY OF INVENTION

Technical Problem

However, with the technique proposed in the Patent Literature 1, a liquid brazing filler metal is generated more rapidly than the outermost surface layer during the brazing heating process, since the intermediate layer has a lower solidus temperature than the outermost surface layer due to the addition of Mg, and also, as the amount of Si added increases, the amount of liquid phase (ratio of liquid phase) increases. There is a problem that the intermediate layer brazing filler metal, that started to melt before the outermost surface layer melts, flows out from the material end and stops functioning as an effective fluid brazing filler metal flowing in the joining part.

The inventor has overcome the above problem by focusing on the generated amount of liquid brazing filler metal on the intermediate layer and outermost surface layer during the brazing heating process, and by optimizing the alloy composition.

Solution to Problem

That is, in a first aspect of the brazing sheets for flux-free brazing of the present invention, an outermost surface brazing filler metal layer, consisting of an Al—Si-based alloy containing 4 to 12% Si in mass %, and an intermediate brazing filler metal layer consisting of an Al—Si—Mg-based alloy, containing 1% or more and less than 4% Si and 0.1 to 5.0% Mg in mass %, are cladded on one side or both sides of a core material.

In another aspect of the brazing sheets for flux-free brazing according to the preceding aspect of the present invention, the cladding ratios of the outermost surface brazing filler metal layer and the intermediate brazing filler metal layer in the present invention of the above form are each 1 to 30% per each side relative to the overall thickness of the brazing sheet.

In another aspect of the brazing sheets for flux-free brazing according to any preceding aspect of the present invention, 0.01 to 0.5% Bi is contained in mass % in the brazing filler metal of the intermediate brazing filler metal layer.

In another aspect of the brazing sheets for flux-free brazing according to any preceding aspect of the present invention, 0.01 to 0.5% Bi in mass % is contained in the brazing filler metal of the outermost surface brazing filler metal layer.

In another aspect of the brazing sheets for flux-free brazing according to any preceding aspect of the present invention, in the outermost surface brazing filler metal layer, the number of Si particles having a circle equivalent diameter of 1.75 µm or more accounts for 25% or more of the number of those having a circle equivalent diameter of 0.8 µm or more, as observed in the direction of the surface layer.

In another aspect of the brazing sheets for flux-free brazing according to any preceding aspect of the present invention, the intermediate brazing filler metal layer contains less than 100000 per $mm^2$ of Si particles having a circle equivalent diameter of 0.25 µm or more, as observed in a cross section of the brazing filler metal layer.

In the method for flux-free brazing of aluminum members of the present invention, the aluminum members are joined to each other without using flux, in a non-oxidizing gas atmosphere with an oxygen concentration of 300 ppm or less, using the brazing sheet for flux-free brazing of the above form.

In the method for producing a heat exchanger according to the present invention, the aluminum members are joined to each other without using flux, in a non-oxidizing gas atmosphere with an oxygen concentration of 300 ppm or less, using the brazing sheet for flux-free brazing of the above form.

Next is a description of the content provided for in the claimed invention. The contents in the description of the components are all indicated in mass %.

Brazing Filler Metal Composition of the Outermost Surface Brazing Filler Metal Layer Si: 4 to 12%

On the outermost surface brazing filler metal layer, a molten brazing filler metal is formed by Si at the time of brazing and a fillet of the joining part is formed. When the Si content is insufficient, the molten brazing filler metal to form the fillet is insufficient. Moreover, the diffusion of Mg from the intermediate layer is delayed, and sufficient junction cannot be obtained. On the other hand, when the Si content becomes excessive, the effect becomes saturated. Moreover, production of the material becomes difficult, because the material becomes hard and brittle.

Therefore, the Si content in the brazing filler metal of the outermost surface brazing filler metal layer is 4 to 12%. Moreover, for similar reasons, it is further desirable that the lower limit of the Si content be 6%, and the upper limit 11%.

Bi: 0.01 to 0.5%

Bi is contained if desired, since it concentrates on the material surface during the brazing heating process, and suppresses the growth of a dense oxide film. When the content of Bi is insufficient, the effect is insufficient, and when Bi is contained in excess, the effect becomes saturated. Therefore, it is desirable that the content of Bi be 0.01 to 0.5%. Moreover, for similar reasons, it is further desirable that the lower limit of Bi be 0.02%, and the upper limit 0.2%.

Brazing Filler Metal Composition of the Intermediate Brazing Filler Metal Layer

Si: 1% or More and Less than 4%

Si generates a liquid phase in the intermediate layer at the time of brazing and promotes the diffusion to the outermost surface layer of the Mg added to the intermediate layer. When the Si content is insufficient, the effect is insufficient, and when Si is contained in excess, a sufficient joining state cannot be obtained due to an excessive liquid phase flowing out from the material end etc., and to the Mg in the intermediate layer running out.

Therefore, the Si content is 1% or more and less than 4%. For similar reasons, it is desirable that the lower limit of the Si content be 1.5%, and the upper limit 3%.

Mg: 0.1 to 5.0%

Mg reduces and decomposes the Al oxide film ($Al_2O_3$). However, when the Mg content is insufficient, the effect is insufficient, and when the Mg content is excessive, the production of materials becomes difficult, because the effect becomes saturated and the material becomes hard and brittle. Therefore, the Mg content is 0.1 to 5.0%. For similar reasons, it is desirable that the lower limit be 0.3% and the upper limit 3.0%, and it is more desirable that the lower limit be 0.8% and the upper limit 2.5%.

Bi: 0.01 to 0.5%

Bi is contained if desired, since it concentrates on the material surface during the brazing heating process, and suppresses the growth of a dense oxide film. When the Bi content is insufficient, the effect is insufficient, and when the Bi content is excessive, the effect becomes saturated. Therefore, it is desirable that the Bi content be 0.01 to 0.5%. For similar reasons, it is desirable that the lower limit be 0.02%, and the upper limit 0.2%.

Cladding Ratio of the Brazing Filler Metal: 1 to 30%

It is desirable that the cladding ratios of the outermost surface brazing filler metal layer and the intermediate brazing filler metal layer be each 1 to 30% per each side relative to the overall thickness of the brazing sheet. The problem is that, when the cladding ratio is too small, the longitudinal cladding ratio varies more easily on clad lamination by hot rolling, and when the cladding ratio is too large, the joining state of the clad interface becomes unstable on clad lamination, and a sufficient production quality cannot be ensured. Moreover, it is desirable to ensure that the cladding ratio of the core material be 50% or more, in order to ensure the structural strength and dimensional accuracy of the products after brazing.

Also, when implementing the present invention, it is preferable that relatively coarse Si particles be present on the brazing filler metal surface of the outermost surface layer. Normally, a dense oxide film of $Al_2O_3$ etc. is present on the surface of the aluminum material, and this further grows and becomes a thick film during the process of brazing heat treatment. The general view is that the more the thickness of the oxide film increases, the stronger the tendency to block the destructive effect of the oxide film becomes. In the present invention, by having coarse Si particles present on the brazing filler metal surface of the outermost surface layer, the dense oxide film of aluminum does not grow on the coarse Si particle surface and this part works as a defect in the oxide film on the surface of the aluminum material. Namely, it is considered that, even if the oxide film on the surface of the aluminum material becomes a thick film during the brazing heat treatment, oozing etc. of the brazing filler metal from the Si particle part occurs and the destructive effect of the oxide film progresses starting from this part. Here, the Si particle refers to a Si particle with only Si component in terms of composition, or also includes, for example, Fe—Si-based compounds and Al—Fe—Si-based intermetallic compounds with Fe—Si as the main component. In the description of the present invention, these are conveniently written as Si particles. Specifically, if considering the Si particles on the brazing filler metal surface with their circle equivalent diameter and counting the number of Si particles of 0.8 μm or more, this effect can be obtained sufficiently when the relative number of those of 1.75 μm or more is 25% or more. The density of the Si particles is not mentioned in the present invention, but since the number of Si particles of 0.8 μm or more in a visual field of 10000 μm² is thought to range from dozens to thousands from the alloy composition and the production condition range used in the present invention, and the finishing plate thickness of the material, and the prescription thereof is difficult, in the present invention, the above prescription has been defined as desirable after confirming that the effect is obtained if, within this range of Si particle number, the relative number of those of 1.75 μm or more is 25% or more.

Also, when implementing the present invention, it is preferable that the Si particles in the brazing filler metal of the intermediate layer be finely dispersed. In the present invention, when the brazing filler metal of the intermediate layer in which Mg was added during the brazing heating process reaches the solidus temperature, melting starts from the $Mg_2Si$ particles etc., and the diffusion of Mg in the outermost surface brazing filler metal layer progresses more easily, but when the Si particles in the brazing filler metal of the intermediate layer are coarse and roughly distributed, the diffusion of Mg towards the outermost surface brazing filler metal layer becomes uneven, making the decomposition of the oxide film ($Al_2O_3$ etc.) by the Mg on the surface of the outermost surface brazing filler metal layer also uneven, and the joining state unstable. Here, the Si particle refers to a Si particle with only Si component in terms of composition, or also includes, for example, intermetallic compounds such as $Mg_2Si$ compounds. In the description of the present invention, these are conveniently written as Si particles. Specifically, the effect is obtained by having less than 100000 Si particles of 0.25 μm or more per mm², when considering the Si particles seen in the cross-section of the brazing filler metal of the intermediate layer by their circle equivalent diameter. It is desirable that the particle diameter of the Si particles be more finely and densely dispersed within the range satisfying the above. Examples of means to make the Si particles fine include applying ultrasonic waves or adjusting the solidifying speed (0.1 to 500° C./sec) during the casting, adjusting by the temperature conditions during the annealing, or adding Sr which has a refining effect on the Si particles in the brazing filler metal, but the methods thereof are not limited.

Non-Oxidizing Gas Atmosphere with an Oxygen Concentration of 300 Ppm or Less

With the above brazing sheet, brazing can be performed flux-free in a non-oxidizing gas atmosphere with an oxygen concentration of 300 ppm or less.

The pressure of the atmosphere inside the brazing furnace is basically the normal pressure, but it can be, for example, a medium to low vacuum of about 100 kPa to 0.1 Pa in the temperature range before the melting of the brazing filler metal in order to improve the gas replacement efficiency inside the product, or a positive pressure of about 5 to 100 Pa more than the atmospheric pressure in order to prevent the inclusion of outside air (atmospheric air) in the furnace.

Examples of non-oxidizing gas atmosphere include nitrogen gas or reducing gas, or a mixed gas thereof. The types of replacement gas to be used are not particularly limited for the joining of aluminum materials, but from a viewpoint of cost, it is preferable to use nitrogen gas, argon as an inert gas, or hydrogen or ammonia as reducing gas. 300 ppm or less is desirable as a controlled range of the oxygen concentration in the atmosphere. Above 300 ppm, the reoxidation of the member to be brazed progresses more easily. It is further desirable to be 100 ppm or less.

Advantageous Effects of Invention

Namely, according to the present invention, use of a brazing filler metal without Mg, as the outermost surface and a brazing filler metal with Mg of low liquid phase ratio as the intermediate layer can suppress the growth of MgO film on the material surface during the brazing heating process, while efficiently delivering Mg capable of decomposing Al oxide film ($Al_2O_3$) to the material surface during the melting of the brazing filler metal, allowing the molten brazing filler metal to wetly spread more easily on the joining part surface and also to provide a good joining state on a joint having an open part. Since the intermediate layer melts from a lower temperature than the outermost surface layer by adding Mg, when the amount of Si in the intermediate layer is great and the liquid phase ratio is high, the amount of Mg flowing out from the material end part and affecting the material surface can decrease and a MgO film can be formed on the material surface, inhibiting the joining by eroding the outermost surface layer from the inside and oozing out to the material surface at an early stage, but this trouble does not occur in the present invention because the amount of Si in the intermediate layer is small and the liquid phase ratio is low.

The present invention allows to obtain a good joining state on joints having an open part even without conducting any particular control of the low oxygen concentration, ensuring strength and durability of the joining part equivalent to or greater than the conventional brazing method in outer fins and tube root parts of radiators, condensers, evaporators, heater cores, intercoolers, etc. Moreover, in the tube inner channel of oil coolers and inverter coolers having a dense internal structure, or of evaporators and condensers, the cooling performance as designed can be exerted, without clogging of the inner channel by the brazing filler metal, by limiting the amount of Si in the intermediate layer and preventing the outflow of the excess melted brazing filler metal.

Moreover, in this embodiment, an automobile heat exchanger was described as an application use of the present invention, but the uses for the present invention are not limited thereto.

DESCRIPTION OF EMBODIMENT

The following describes one embodiment of the present invention on the basis of the attached drawings.

Of the aluminum alloys for the brazing filler metal, that for the outermost surface layer is prepared to a composition containing, in mass %, Si: 4 to 12%, containing, as desired, Bi: 0.01 to 0.5%, and with Al and inevitable impurities as the balance, and that for the intermediate layer is prepared to a composition containing, in mass %, Si: 1% or more and less than 4%, containing Mg: 0.1 to 5.0%, containing, as desired, Bi: 0.01 to 0.5%, and with Al and inevitable impurities as the balance. Moreover, as aluminum alloys for the brazing filler metal, others such as Fe, Cu, Mn, Ca, Li, and Be can be contained in known amounts as the brazing filler metal.

Moreover, the aluminum alloy for the core material is prepared to a composition containing, in mass %, Mn: 0.1 to 3.0%, Si: 0.1 to 1.2%, Cu: 0.1 to 3.0%, and with Al and inevitable impurities as the balance. Moreover, as the aluminum alloy for the core material, others such as Si, Mn, Fe, Mg and Bi can be contained in known amounts.

For the present invention, the composition of the aluminum alloy for the core material is not particularly limited, but alloys with positively added Mg and Si can be used preferably since they can achieve a significantly high strength of the material by precipitating $Mg_2Si$ etc. With the conventional brazing method using a fluoride-based flux, since the flux becomes inactive by reacting with Mg and generating Mg fluoride of high melting point, the brazability was decreased, and it was difficult to apply it to high strength Mg added alloys since Mg is consumed by this reaction, but with flux-free brazing, it is possible to utilize high strength Mg added alloys.

An aluminum alloy with Zn can be cladded as a sacrificial anticorrosion layer between any clad layers, or on the core material surface wherein the brazing filler metal is not cladded.

A clad material joined by performing hot rolling and cold rolling on these alloys, and superposing the intermediate brazing filler metal layer and the outermost surface brazing filler metal layer on one side or both sides of the core material, is obtained.

Figure 1:
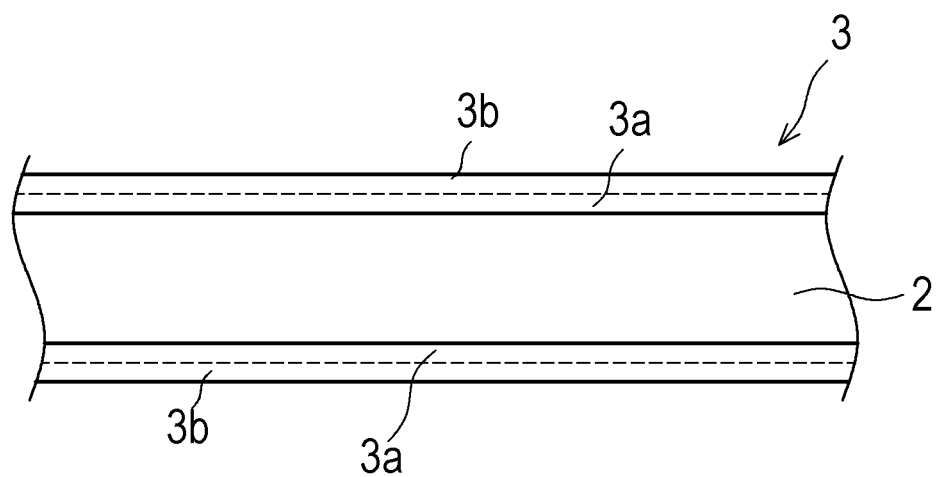
FIG. 1 shows a brazing sheet for flux-free brazing in one embodiment of the present invention.

Going through the above process allows to obtain a brazing sheet 1 for a heat exchanger wherein an aluminum alloy brazing filler metal 3 is cladded on both sides of an aluminum alloy core material 2, as shown in FIG. 1. The aluminum alloy core material 2 corresponds to the aluminum alloy member of the present invention. The aluminum alloy brazing filler metal 3 consists of an intermediate brazing filler metal layer 3a and an outermost surface brazing filler metal layer 3b.

Each intermediate brazing filler metal layer 3a and outermost surface brazing filler metal layer 3b have a thickness of 1 to 30% to the total thickness of the brazing sheet 1.

The brazing sheet 1 can be used as the tube, header, tank, outer fin or inner fin of the heat exchanger.

On the other hand, as the object member to be brazed, an aluminum alloy containing, for example, in mass %, Mg: 0.1 to 0.8%, containing Si: 0.1 to 1.2%, and with Al and inevitable impurities as the balance can be prepared and processed into an appropriate shape. The object member to be brazed corresponds to the aluminum member of the present invention. The composition of the object member to be brazed is not particularly limited in the present invention and one with the appropriate composition can be used.

It is desirable that the brazing sheet 1 be adjusted so that the outermost surface brazing filler metal layer 3b is located on the outermost surface, the average film thickness of the surface oxide film is 15 nm or less, and the average film thickness of the MgO film in the surface oxide film is 2 nm or less.

Moreover, it is desirable that the object member to be brazed be adjusted so that, at least on the joining face, the average film thickness of the surface oxide film is 15 nm or less and the thickness of the MgO film inside the film is 2 nm or less.

The surface oxide film can be adjusted by temperature and time for various heat treatments such as homogenization after the casting, soaking before hot rolling and annealing after cold rolling.

The brazing sheet 1 and the object member to be brazed are arranged so that the intermediate brazing filler metal layer 3a and the outermost surface brazing filler metal layer 3b are interposed flux-free between the aluminum alloy core material 2 and the object member to be brazed. These are assembled to form an assembly of aluminum alloys for brazing. Therefore, the brazing sheet 1 corresponds to the brazing sheet for flux-free brazing of the present invention.

The assembly is arranged in a heating furnace with a non-oxidizing atmosphere under normal pressure. The non-oxidizing gas can be composed using nitrogen gas, or inert gas such as argon, or reducing gas such as hydrogen and ammonia, or a mixed gas thereof. The pressure of the atmosphere inside the brazing furnace is basically the normal pressure, but it can be, for example, a medium to low vacuum of about 100 kPa to 0.1 Pa in the temperature range before the melting of the brazing filler metal in order to improve the gas replacement efficiency inside the product, or a positive pressure of about 5 to 100 Pa more than the atmospheric pressure in order to suppress the inclusion of outside air (atmospheric air) in the furnace. The heating furnace does not need to have a closed space, and can be a tunnel type having a carrying-in port and a carrying-out port for brazing filler metals. Even in such a heating furnace, the non-oxidizing property can be maintained by continuously blowing off an inert gas in the furnace. As the non-oxidizing atmosphere, an oxygen concentration of 300 ppm or less in volume ratio is desirable.

Under the above atmosphere, brazing and joining are performed, for example, by heating at a temperature rising speed of 10 to 200° C./min, and under the heat treatment conditions wherein the arrival temperature of the assembly is 580 to 620° C.

In the brazing conditions, the brazability is improved by suppressing the growth of the oxide film on the material surface, since the faster the temperature rising speed is, the shorter the brazing time is. Brazing is possible if the arrival temperature is at least higher than the solidus temperature of the brazing filler metal, but the fluid brazing filler metal increases by getting close to the liquidus temperature, and a good joining state is more easily obtained with a joint having an open part. However, when the temperature is too high, braze erosion progresses more easily and the structural dimensional accuracy of the assembly after brazing decreases, and so it is not preferable.

Figure 2:
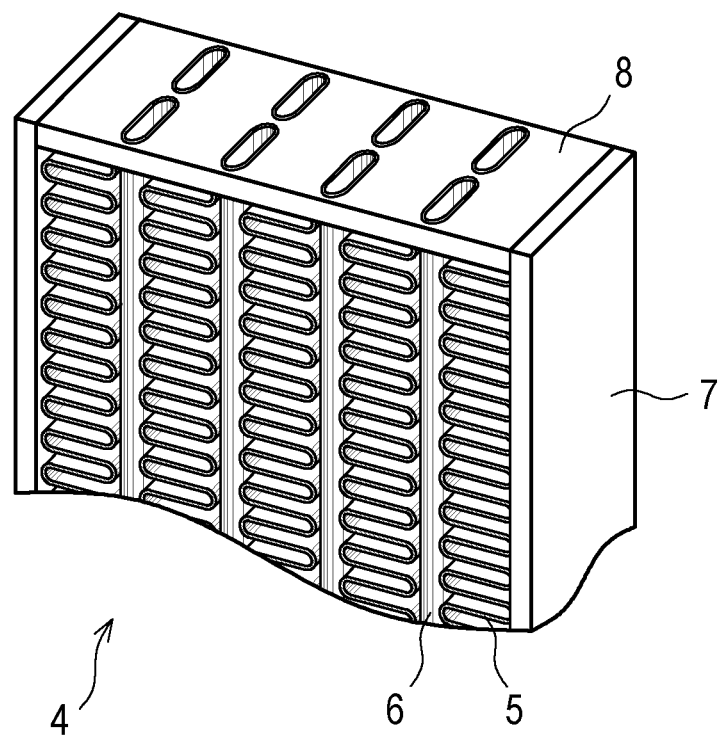
FIG. 2 shows a perspective view of an aluminum-made automobile heat exchanger in one embodiment of the present invention.

FIG. 2 shows an aluminum-made automobile heat exchanger 4 forming a fin 5 using the brazing sheet 1, and using an aluminum alloy-made tube 6 as the object member to be brazed. The aluminum-made automobile heat exchanger 4 is obtained by incorporating the fin 5 and the tube 6 to a reinforcement 7 and a header plate 8, and by flux-free brazing.

Example 1

The brazing filler metals of the composition shown in Table 1 and Table 2 (Al and the inevitable impurities are the balance), and an aluminum material cladded with a core material of JIS A3003 were prepared.

For the aluminum clad materials, the brazing filler metals of the various compositions were set at a cladding ratio of 5% and finished so as to have a 0.25 mm thickness of a temper equivalent to H14. Moreover, as the object member to be brazed, a corrugate fin 11 of JISA3005 alloy, H14 aluminum bare material (0.1 mm thick) was prepared.

TABLE 1

Composition of the outermost surface layer brazing filler metal (mass %)

| No. | Si | Mg | Bi |
|---|---|---|---|
| 1 | 5 | — | — |
| 2 | 7 | — | — |
| 3 | 9 | — | — |
| 4 | 11 | — | — |
| 5 | 5 | — | 0.02 |
| 6 | 7 | — | 0.02 |
| 7 | 11 | — | 0.02 |
| 8 | 5 | — | 0.1 |
| 9 | 7 | — | 0.1 |
| 10 | 11 | — | 0.1 |
| 11 | 5 | — | 0.3 |
| 12 | 7 | — | 0.3 |
| 13 | 11 | — | 0.3 |
| 14 | 9 | 1.0 | — |
| 15 | 9 | 1.5 | 0.1 |

TABLE 2

Composition of the intermediate layer brazing filler metal (mass %)

| No. | Si | Mg | Bi |
|---|---|---|---|
| 1 | 1.5 | 0.5 | — |
| 2 | 2.5 | 0.5 | — |
| 3 | 3.5 | 0.5 | — |
| 4 | 1.5 | 1.0 | — |
| 5 | 2.5 | 1.0 | — |
| 6 | 3.5 | 1.0 | — |
| 7 | 1.5 | 1.5 | — |
| 8 | 2.5 | 1.5 | — |
| 9 | 3.5 | 1.5 | — |
| 10 | 1.5 | 2.5 | — |
| 11 | 2.5 | 2.5 | — |
| 12 | 3.5 | 2.5 | — |
| 13 | 1.5 | 4.0 | — |
| 14 | 2.5 | 4.0 | — |
| 15 | 3.5 | 4.0 | — |

TABLE 2-continued

| Composition of the intermediate layer brazing filler metal (mass %) | | | |
|---|---|---|---|
| No. | Si | Mg | Bi |
| 16 | 1.5 | 1.5 | 0.02 |
| 17 | 2.5 | 1.5 | 0.02 |
| 18 | 3.5 | 1.5 | 0.02 |
| 19 | 1.5 | 1.5 | 0.1 |
| 20 | 2.5 | 1.5 | 0.1 |
| 21 | 3.5 | 1.5 | 0.1 |
| 22 | 1.5 | 1.5 | 0.3 |
| 23 | 2.5 | 1.5 | 0.3 |
| 24 | 3.5 | 1.5 | 0.3 |
| 25 | 2.5 | — | — |
| 26 | 2.5 | — | 0.1 |

Figure 3:
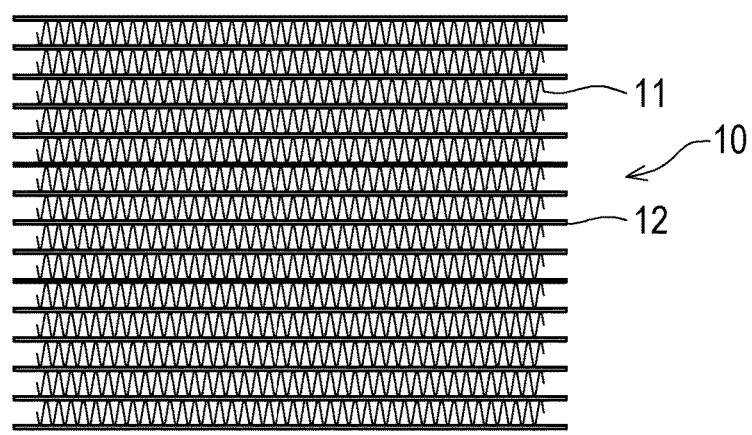
FIG. 3 shows the brazing evaluation model in examples of the present invention.
Figure 3:
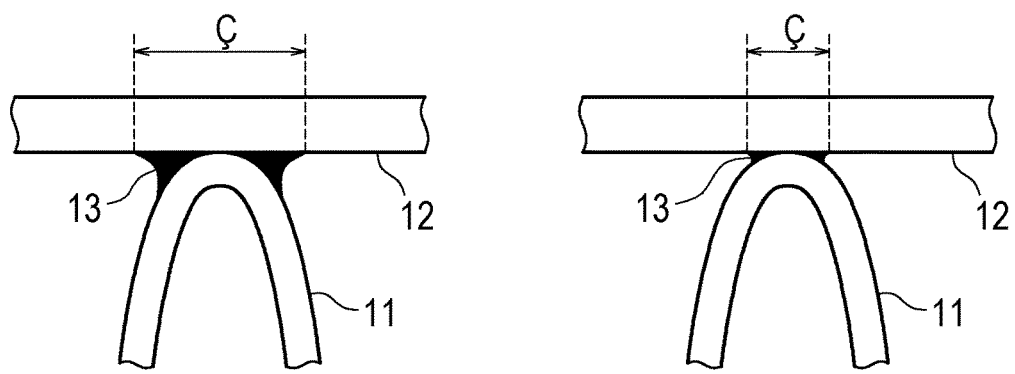

A 20 mm wide tube 12 was produced using the aluminum clad material, the tube 12 and the corrugate fin 11 were combined, and a 15-steps tube and a 300 mm long core 10 as shown in FIG. 3(a) were made as the brazing evaluation model. The core was heated to 600° C. in a brazing furnace in a nitrogen atmosphere (oxygen content of 80 ppm), and the brazing state was evaluated.

Brazability
Joining Rate
The joining rate was found with the following formula, and the superiority/inferiority of each sample was evaluated.

Fin joining rate=(total brazing length of the fin and the tube/total contact length of the fin and the tube)×100

The classification was made according to the following criteria and the results are shown in Table 3 and 4. Fin joining rate after brazing Excellent: 98% or more, Good: 90% or more and less than 98%, Fair: 80% or more and less than 90%, Poor: less than 80%

Evaluation of the Joining Part Width
Since the brazing joining state is to confirm not only the above joining rate, but also the improvement of the fillet forming capacity that is the purpose of the present invention, the width W of the joining part 13 as shown in FIG. 3(b) was measured on 20 points in each sample, and the superiority/inferiority was evaluated based on its average value. The classification was made according to the following criteria and shown in Table 3 and 4. Excellent: 0.8 mm or more, Good: 0.7 mm or more and less than 0.8 mm, Fair: 0.6 mm or more and less than 0.7 mm, Poor: less than 0.6 mm Whereas all the examples showed a good brazability, a sufficient joining was not obtained in the comparative examples.

TABLE 3

| | | Brazing filler metal | | Outermost surfaces layer brazing filler metal the proportion of Si particles of 1.75 μm or more [%] | Intermediate layer brazing filler metal the number of si particles of 0.25 μm or more [piece/mm²] | Brazability | Joining part width |
|---|---|---|---|---|---|---|---|
| | | Outermost surface layer No. | Intermediate layer No. | | | | |
| Example | 1 | 1 | 8 | 10 | 45000 | ◎ | Δ |
| | 2 | 2 | 8 | 20 | 45000 | ◎ | ○ |
| | 3 | 3 | 8 | 30 | 45000 | ◎ | ◎ |
| | 4 | 4 | 8 | 40 | 45000 | ◎ | ◎ |
| | 5 | 5 | 8 | 15 | 45000 | ◎ | ○ |
| | 6 | 6 | 8 | 25 | 45000 | ◎ | ◎ |
| | 7 | 7 | 8 | 35 | 45000 | ◎ | ◎ |
| | 8 | 8 | 8 | 25 | 45000 | ◎ | ◎ |
| | 9 | 9 | 8 | 30 | 45000 | ◎ | ◎ |
| | 10 | 10 | 8 | 35 | 45000 | ◎ | ◎ |
| | 11 | 11 | 8 | 30 | 45000 | ◎ | ◎ |
| | 12 | 12 | 8 | 35 | 45000 | ◎ | ◎ |
| | 13 | 13 | 8 | 35 | 45000 | ◎ | ◎ |
| | 14 | 3 | 1 | 30 | 30000 | Δ | Δ |
| | 15 | 3 | 2 | 30 | 35000 | Δ | Δ |
| | 16 | 3 | 3 | 30 | 40000 | Δ | Δ |
| | 17 | 3 | 4 | 30 | 35000 | ○ | Δ |
| | 18 | 3 | 5 | 30 | 40000 | ◎ | ○ |
| | 19 | 3 | 6 | 30 | 45000 | ◎ | ○ |
| | 20 | 3 | 7 | 30 | 40000 | ◎ | ◎ |
| | 21 | 3 | 9 | 30 | 50000 | ◎ | ◎ |
| | 22 | 3 | 10 | 30 | 50000 | ◎ | ◎ |
| | 23 | 3 | 11 | 30 | 60000 | ◎ | ◎ |
| | 24 | 3 | 12 | 30 | 70000 | ◎ | ◎ |
| | 25 | 3 | 13 | 30 | 60000 | ◎ | ◎ |
| | 26 | 3 | 14 | 30 | 70000 | ◎ | ◎ |
| | 27 | 3 | 15 | 30 | 80000 | ◎ | ○ |
| | 28 | 3 | 16 | 30 | 55000 | ◎ | ◎ |
| | 29 | 3 | 17 | 30 | 58000 | ◎ | ◎ |
| | 30 | 3 | 18 | 30 | 60000 | ◎ | ◎ |
| | 31 | 3 | 19 | 30 | 53000 | ◎ | ◎ |
| | 32 | 3 | 20 | 30 | 56000 | ◎ | ◎ |
| | 33 | 3 | 21 | 30 | 58000 | ◎ | ◎ |
| | 34 | 3 | 22 | 30 | 50000 | ◎ | ◎ |
| | 35 | 3 | 23 | 30 | 54000 | ◎ | ◎ |
| | 36 | 3 | 24 | 30 | 58000 | ◎ | ◎ |
| | 37 | 7 | 2 | 35 | 35000 | ○ | ○ |
| | 38 | 7 | 5 | 35 | 40000 | ◎ | ◎ |
| | 39 | 7 | 8 | 35 | 45000 | ◎ | ◎ |
| | 40 | 7 | 11 | 35 | 60000 | ◎ | ◎ |

TABLE 3-continued

| Brazing filler metal | | Outermost surfaces layer brazing filler metal the proportion of Si particles of 1.75 μm or more [%] | Intermediate layer brazing filler metal the number of si particles of 0.25 μm or more [piece/mm²] | Brazability | Joining part width |
|---|---|---|---|---|---|
| Outermost surface layer No. | Intermediate layer No. | | | | |
| 41 | 7 | 17 | 35 | 58000 | ⊚ | ⊚ |
| 42 | 7 | 20 | 35 | 56000 | ⊚ | ⊚ |
| 43 | 7 | 23 | 35 | 54000 | ⊚ | ⊚ |

TABLE 4

| | | Brazing filler metal | | Outermost surfaces layer brazing filler metal the proportion of Si particles of 1.75 μm or more [%] | Intermediate layer brazing filler metal the number of si particles of 0.25 μm or more [piece/mm²] | Brazability | Joining Partwidth |
|---|---|---|---|---|---|---|---|
| | | Outermost Surface layer No. | Intermediate layer No. | | | | |
| Comparative example | 1 | 14 | 9 | 35 | 50000 | X | X |
| | 2 | 15 | 9 | 30 | 50000 | X | X |
| | 3 | 3 | 25 | 30 | 40000 | X | X |
| | 4 | 3 | 26 | 30 | 30000 | X | X |
| | 5 | 14 | 25 | 35 | 40000 | X | X |
| | 6 | 14 | 26 | 35 | 30000 | X | X |
| | 7 | 15 | 25 | 30 | 40000 | X | X |
| | 8 | 15 | 26 | 30 | 30000 | X | X |

The present invention was described on the basis of the above embodiment and examples, but the present invention is not limited to the content of the above embodiment and examples, and as long as it does not deviate from the claimed invention, the content of the above embodiment and examples can be changed appropriately.

INDUSTRIAL APPLICABILITY

Using the present invention makes brazing joining possible for automobile heat exchangers, but also for aluminum-made heat exchangers, coolers, heat sinks, radiators etc. used in railway vehicles, airplanes, electronic components such as inverters and CPUs, various plants, industries and air conditioning appliances, without using flux. Since flux is not used in the present invention, there is no decrease in the surface quality or the surface chemical convertibility due to flux residues after brazing, and no trouble with the electric element due to contamination caused by the residues.

REFERENCE SIGNS LIST 1 brazing sheet
2 aluminum alloy core material
3 aluminum alloy brazing filler metal
3a intermediate brazing filler metal layer
3b outermost surface brazing filler metal layer
4 aluminum-made automobile heat exchanger

The invention claimed is:

1. A brazing sheet for flux-free brazing, wherein an outermost surface brazing filler metal layer, consisting of an Al—Si-based alloy comprising 4 to 12% Si in mass %, and an intermediate brazing filler metal layer, consisting of an Al—Si—Mg-based alloy comprising 2.5% or more and less than 4% Si and 0.1 to 5.0% Mg in mass %, are cladded on one side or both sides of a core material.

2. The brazing sheet for flux-free brazing according to claim 1, wherein cladding ratios of the outermost surface brazing filler metal layer and the intermediate brazing filler metal layer are each 1 to 30% per each side relative to an overall thickness of the brazing sheet.

3. The brazing sheet for flux-free brazing according to claim 1, wherein 0.01 to 0.5% Bi in mass % is contained in a brazing filler metal of the intermediate brazing filler metal layer.

4. The brazing sheet for flux-free brazing according to claim 1, wherein 0.01 to 0.5% Bi in mass % is contained in a brazing filler metal of the outermost surface brazing filler metal layer.

5. The brazing sheet for flux-free brazing according to claim 1, wherein in the outermost surface brazing filler metal layer, a first number of Si particles having a circle equivalent diameter of at least 1.75 μm accounts for at least 25% of a second number of Si particles having a circle equivalent diameter of at least 0.8 μm, as observed in the direction of the surface layer.

6. The brazing sheet for flux-free brazing according to claim 1, wherein the intermediate brazing filler metal layer has fewer than 100,000 per mm² of Si particles having a circle equivalent diameter of 0.25 μm or more, as observed in a cross section of the brazing filler metal layer.

7. A method for flux-free brazing of aluminum members, wherein the aluminum members are joined to each other without using flux in a non-oxidizing gas atmosphere with an oxygen concentration of 300 ppm or less, using brazing sheets for flux-free brazing according to claim 1.

8. A method for producing a heat exchanger, wherein aluminum members are joined to each other without using flux in a non-oxidizing gas atmosphere with an oxygen concentration of 300 ppm or less, using brazing sheets for flux-free brazing according to claim 1.

9. The brazing sheet for flux-free brazing according to claim 5, wherein the intermediate brazing filler metal layer has fewer than 100,000 per mm$^2$ of Si particles having a circle equivalent diameter of 0.25 μm or more, as observed in a cross section of the brazing filler metal layer.

* * * * *